July 23, 1929.   A. BRAUN   1,722,034

SPEED CONTROL DEVICE FOR AUTOMOTIVE VEHICLES

Filed July 1, 1926

INVENTOR
Adolf Braun
BY
ATTORNEY

Patented July 23, 1929.

1,722,034

UNITED STATES PATENT OFFICE.

ADOLF BRAUN, OF NEW YORK, N. Y.

SPEED-CONTROL DEVICE FOR AUTOMOTIVE VEHICLES.

Application filed July 1, 1926. Serial No. 119,786.

This invention relates generally to a device for automatically limiting the speed of a moving vehicle to a predetermined maximum.

In my prior Patent No. 1,251,176, December 25, 1917, I have described and claimed a speed control device for automotive vehicles in which a valve controlling the supply of fuel gas mixture to the engine was arranged to be operated to shut off the gas supply at a predetermined maximum speed. Means for regulating the speed at which the device closed the valve was mounted on the vehicle dashboard.

One of the objects of the present invention is to provide a speed control device of the general type referred to in which an improved, simplified, and more compact construction is provided.

Another object of the invention is to locate the regulating or setting means for predetermining the speed at which the speed control device operates in close proximity to the control device mechanism so as to provide for locking the entire apparatus against manipulation except by an authorized person. The location of the regulating means in the relatively inaccessible position beneath the engine hood, instead of on the dashboard, also renders it inconvenient for a driver to adjust the regulating means to increase the authorized speed, in case of accident, without first stopping the car and dismounting to make the adjustment.

The invention comprises speed controlling mechanism of the centrifugal governor type mounted in compact relation on a frame member which also supports a valve structure adapted to be inserted in the fuel intake pipe of the engine. The framework also supports a setting device mounted in closely associated relation with the control mechanism. The compact arrangement of structure thus obtained is utilized in the provision of a removable housing adapted to be sealed to protect the device against unauthorized manipulation.

Other features of the invention will be hereinafter referred to.

In the drawings, in which a preferred embodiment of the invention has been selected for illustration:

Figure 1:
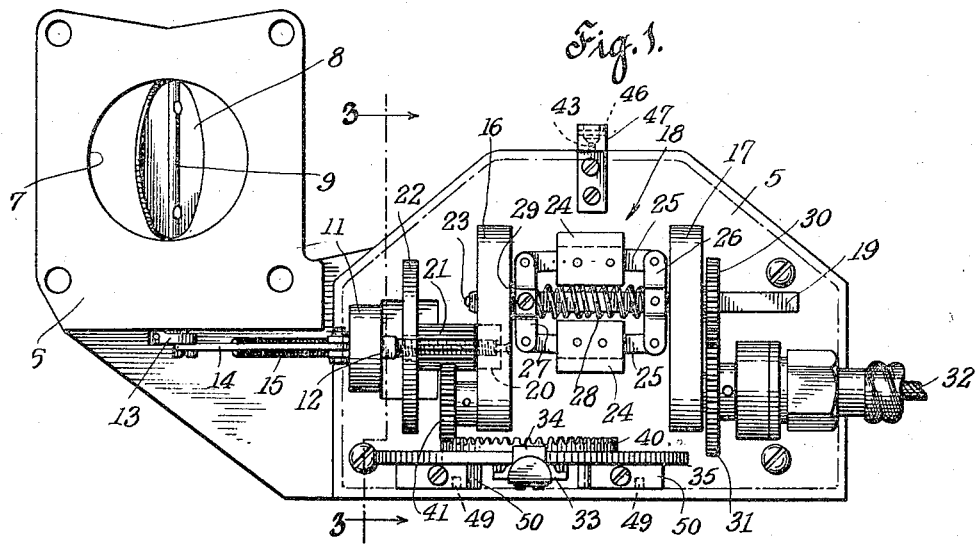
Fig. 1 is a plan view of a speed control device embodying the invention.

Referring to the drawings for a more detailed description of the invention, a speed control device is shown which includes a unitary frame or supporting member 5 having an extension 6 provided with a valve housing recess 7 in which a simple valve 8 of a hinged or butterfly type may be mounted on a rotatable axis 9. The extension portion 6 of the frame member may be inserted in the body of a fuel intake pipe of an engine in such manner as to bring the recess opening 7 into register with the bore of the pipe.

Figure 2:
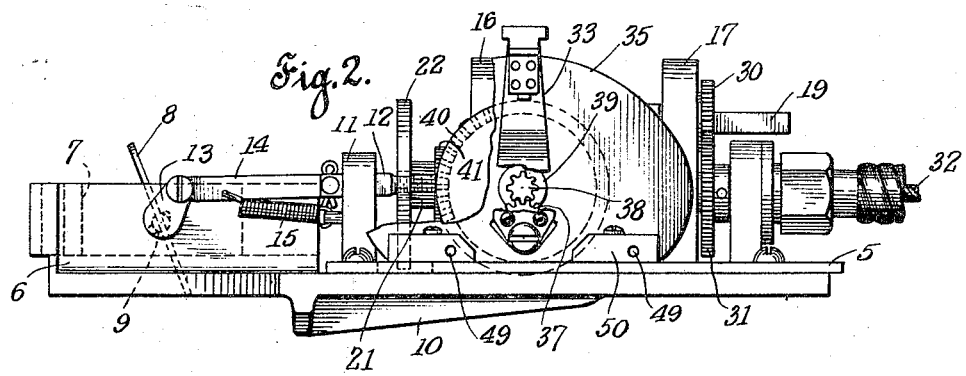
Fig. 2 is a view in side elevation with parts broken away of the device shown in Fig. 1.
Figures 3, 4:
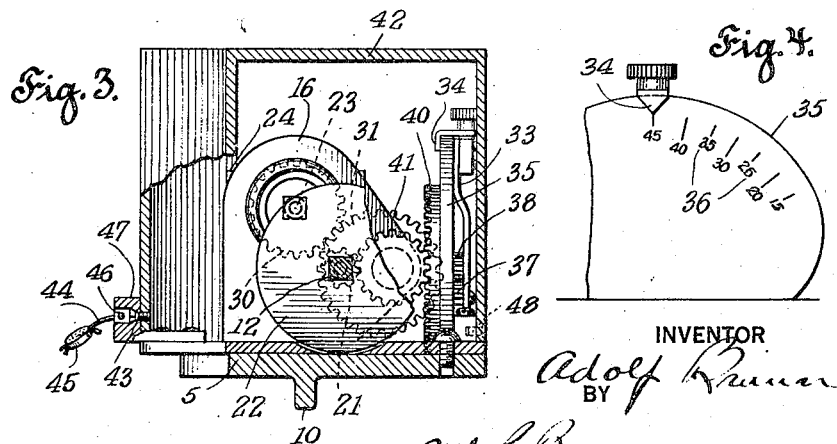
Fig. 3 is a view in vertical section taken on the line 3—3 of Fig. 1 and showing a housing for the operating parts.
Fig. 4 is a view in front elevation of a portion of an indicating member forming part of the invention.

The insertion of the extension portion 6 in the body of the intake pipe provides a support for the frame member 5 proper which in turn provides a support for the mechanism constituting the control device. The frame member 5 may be formed of any suitable metal, such as aluminum, and may be reinforced by the provision on its under surface of a rib member 10, such as is shown in Fig. 2 of the drawings. At one end of the supporting base 5 a post member 11 is provided through which a slidable stem 12 extends, the stem 12 being connected to a crank arm 13 on the valve stem 9 through a link member 14. A spring 15 is connected at its opposite ends to the link member 14 and to the post 11 and exerts a pull on the link 14 tending to hold the valve 8 in its open position.

A pair of separated standards 16 and 17 are also formed on the supporting member or bed plate 5 and form bearing supports for a centrifugal device 18 provided with a rotatable and longitudinally movable shaft member 19. The standard 16 supports one end of the valve actuating stem 12 which has already been referred to and which is screw threaded for the greater part of its length. The stem 12 is movable longitudinally in a recess 20 provided for the purpose in the body of the standard 16. An elongated spur gear member 21 has threaded relation with the stem 12 and is provided at one end with a radially extending disc member 22 which is engaged by the end 23 of the governor shaft 19 when a speed has been reached which forces the end 23 of the shaft 19 into actuating relation with the disc 22. The engagement of the disc 22 by the end 23 of the shaft 19 results in a closing movement of the valve 8 which is brought about by the movement of the sliding stem 12 in the post 11 against the action of the spring 15 as will be clear.

The centrifugal device or governor 18 is of a standard type and includes weight members 24 hinged to link members 25 which are attached at their other ends to cross bars 26 and 27. The cross bar 26 is attached to the shaft 19 so that movement of the cross bar 26 under the spreading action of the weights 24 against the tension of the spring 28 moves the shaft 19 to the left, as is shown in Fig. 1 of the drawings. The cross bar 27 at the other end of the centrifugal device is attached to a hub member 29 journaled for rotation in the standard 16, the shaft 19 being mounted to slide longitudinally through the hub member. Rotation is given to the centrifugal device through the engagement of the shaft 19 which is squared at its right hand end. The squared formation fits a correspondingly shaped opening in a gear 30 having intermeshing relation with a driving gear 31 rotated through a flexible driving shaft 32 from a moving part of the vehicle, such as a front wheel. In order to vary or change the predetermined speed at which the device becomes effective to close the valve 8 in the fuel supply pipe, a manually operable regulating arm 33 is provided. The arm carries a pointer 34 movable along a calibrated indicating member 35 provided with a scale 36 showing different speeds measured in miles per hour.

The arm 33 is provided with a toothed gear segment 37 meshing with a spur gear 38 which is formed on a hood member 39 on a crown toothed gear 40. The crown gear 40 meshes with a spur gear 41 which in turn engages the elongated gear 21 on the shaft 12 which has already been referred to. In operating the setting mechanism referred to, the arm 33 is moved to carry the binder 34 along the scale 36 whereupon the crown gear 40 is rotated to correspondingly rotate the gears 41 and 21. The gear 21 is thereupon moved along the shaft 12 with which it has screw threaded engagement, thereby changing the position of the disc member 22 with relation to its distance from the end 23 of the governor actuating shaft 19. It will be seen that by thus changing the position of the disc 22, the degree of speed at which the disc 22 is engaged by the shaft end 23 is changed, so that the predetermined degree of speed at which the device is desired to operate can be easily attained.

In order to house the compactly assembled mechanism thus described and prevent manipulation thereof and, particularly, the setting of the arm 33 to establish certain limiting speeds, I provide a housing or casing 42 which rests on the enclosing edge portions of the bed plate 5 and which may be locked in position through the engagement of a screw 43 therewith and by passing the loop 44 of a seal 45 through an opening 46 provided for the purpose in a lug 47 on the bed plate 5 through which the screw 43 is passed into engagement with the housing 42. The other side of the housing 42 is provided with inwardly extending pins 48 which are received in recesses 49 formed for the purpose in lugs 50 attached to the bed plate 5.

The indicating plate 35 may have the scale reading on either or both sides to accommodate the use of the device on either side of the engine in accordance with the location of the fuel intake pipe. I contemplate also the use of the indicating plate in an overhead position in a partially covering relation to the adjacent parts.

It will be seen that I have provided a compact and self-contained structure readily adapted for use in automobiles of different manufacture and that the device is capable of being locked against manipulation except by an authorized person. It will also be seen that the use of the device will prevent driving at excessive and dangerous speeds, since the maximum speed can readily and reliably be predetermined and set to accord with desired or required limits.

What I claim is:

1. In a speed controlling device for automotive vehicles, a valve member adapted to be inserted in the fuel supply pipe of the engine, a longitudinally movable valve actuating rod, a disk carried by the rod, a centrifugal device including a rotatable and axially movable shaft mounted in a position parallel to the valve actuating rod, said shaft being normally unattached to but arranged to directly engage the disk on the rod to actuate the valve when a predetermined degree of speed has been reached, said disk member having adjustable engagement with the rod for adjustment longitudinally thereof, a regulating arm for adjusting the position of the disk, and a calibrated scale associated with the regulating arm.

2. In a speed controlling device for automotive vehicles, a supporting plate having an extension adapted to be fitted into the fuel supply pipe of an engine, a valve member mounted in the extension to control the flow of fuel through the pipe, a longitudinally movable rod connected to the valve to actuate the same, a disk carried by the rod, a centrifugal device including a rotatable and axially movable shaft mounted in a position parallel to the valve actuating rod, said shaft being normally unattached to but arranged to directly engage the disk on the rod to actuate the valve when a predetermined degree of speed has been reached, an elongated gear member attached to the disk and having screw-threaded engagement with the rod, a regulating arm having a gear connection with the elongated gear member for adjusting the disk, and a calibrated scale associated with the regulating arm.

ADOLF BRAUN.